United States Patent
Zimmer et al.

(10) Patent No.: US 12,510,069 B2
(45) Date of Patent: Dec. 30, 2025

(54) METHOD FOR DETERMINING CONTROL MODEL PARAMETERS OF A CONTROL MODEL OF AN AXIAL PISTON PUMP

(71) Applicant: Robert Bosch GmbH, Stuttgart (DE)

(72) Inventors: Christoph Zimmer, Stuttgart (DE); Adrian Trachte, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 35 days.

(21) Appl. No.: 18/294,448

(22) PCT Filed: Aug. 8, 2022

(86) PCT No.: PCT/EP2022/072200
§ 371 (c)(1),
(2) Date: Feb. 1, 2024

(87) PCT Pub. No.: WO2023/016969
PCT Pub. Date: Feb. 16, 2023

(65) Prior Publication Data
US 2024/0287971 A1  Aug. 29, 2024

(30) Foreign Application Priority Data
Aug. 12, 2021 (DE) ............ 10 2021 208 824.4

(51) Int. Cl.
*F04B 51/00* (2006.01)
*F04B 49/00* (2006.01)
(Continued)

(52) U.S. Cl.
CPC ............ *F04B 51/00* (2013.01); *F04B 49/002* (2013.01); *F04B 49/065* (2013.01); *F04B 49/10* (2013.01); *F04B 1/295* (2013.01); *F04B 1/324* (2013.01)

(58) Field of Classification Search
CPC .......... F04B 1/324; F04B 1/295; F04B 49/10; F04B 49/065; F04B 49/002; F04B 51/00
See application file for complete search history.

(56) References Cited

U.S. PATENT DOCUMENTS

| | | | |
|---|---|---|---|
| 10,273,867 B2* | 4/2019 | Duan | F01P 5/14 |
| 11,048,281 B2* | 6/2021 | Joos | F15B 9/12 |
| 2020/0125123 A1* | 4/2020 | Anderson | G05D 16/20 |

FOREIGN PATENT DOCUMENTS

| | | |
|---|---|---|
| DE | 10 2014 222 638 A1 | 5/2016 |
| DE | 10 2017 221 637 A1 | 6/2019 |
| WO | 01/36828 A1 | 5/2001 |

OTHER PUBLICATIONS

International Search Report corresponding to PCT Application No. PCT/EP2022/072200, mailed Nov. 28, 2022 (German and English language document) (5 pages).

* cited by examiner

*Primary Examiner* — Charles G Freay
(74) *Attorney, Agent, or Firm* — Maginot, Moore & Beck LLP (57) ABSTRACT

A method is for ascertaining control model parameters of a control model of an axial piston pump. The method models at least one control variable of an adjustment unit of the axial piston pump as a function of operating variables. Operating points of the axial piston pump each are characterized by operating values of the operating variables. The method includes (i) providing initial control model parameters of the control model and an operating state set including a plurality of initial first operating points, (ii) providing initial safety model parameters of a safety model based on a safety set including a plurality of initial second operating points and associated safety values, and (iii) determining a further operating point which is not yet included in the operating (Continued)

state set. The further operating point is determined such that a variance of the control model is maximized.

20 Claims, 4 Drawing Sheets

(51) Int. Cl.
*F04B 49/06* (2006.01)
*F04B 49/10* (2006.01)
F04B 1/295 (2020.01)
F04B 1/324 (2020.01)

METHOD FOR DETERMINING CONTROL MODEL PARAMETERS OF A CONTROL MODEL OF AN AXIAL PISTON PUMP

This application is a 35 U.S.C. § 371 National Stage Application of PCT/EP2022/072200, filed on Aug. 8, 2022, which claims the benefit of priority to Serial No. DE 10 2021 208 824.4, filed on Aug. 12, 2021 in Germany.

The present disclosure relates to a method for ascertaining control model parameters of a control model of an axial piston pump as well as a computing unit and a computer program for executing the method.

BACKGROUND

A hydrostatic traction drive usually has a primary variable adjustment pump and a secondary variable adjustment motor. The primary unit and secondary unit can be connected in both closed and open circuits. For operation, the primary unit and secondary unit are adjusted either separately or coupled. This results in a rotational speed on the secondary side that is proportional to the volume flow. The working pressure is set according to the load torque and is usually limited at the top by a pressure relief valve.

With axial piston pumps in swash plate design, the flow rate is set by adjusting the swivel angle. The adjustment is made, for example, via a hydraulic cylinder. Its chamber pressure can be regulated via a pressure control valve. The pump has a load-sensitive behavior, so that the swash plate is swung back by the working pressure, or more precisely by the differential pressure acting on it. This relationship between working pressure, actuating pressure and swivel angle can be used to control the axial piston pump and thus the traction drive.

According to the disclosure, a method is proposed for ascertaining control model parameters of a control model of an axial piston pump as well as a computing unit and a computer program for executing the method with the features of the independent patent claims. Advantageous embodiments are the subject matter of the dependent claims and the following description.

The control model models at least one control variable of the adjustment unit as a function of operating variables, wherein operating points of the axial piston pump are each characterized (or defined) by specific operating values of the operating variables. The set of operating points defines an n-dimensional space, wherein it is not clear a priori at which operating points in this space the axial piston pump can be operated safely or without errors, i.e., without operation being interrupted due to an error (such as overpressure) and without damage occurring in extreme cases. It is therefore not known from the outset how exactly the space is divided into safe and unsafe operating points. This is due to the fact that series fluctuations within the production tolerances can lead to different operating behavior.

In addition to the control model, the disclosure makes use of a safety model which is a model for the safety of operating points, i.e. which allows an indication to be made as to whether or not safe operation is (probably) possible at an operating point. Starting from some known safe operating points, further operating points are selected in such a way that, on the one hand, a variance of the control model is maximized and, on the other hand, the probability that the further operating point is a safe operating point is above a specified safety threshold. The models (control model, safety model) are then adapted based on the further operating point. By repeating this procedure, the range of known safe operating points can be gradually extended in the range of operating points, wherein the risk of the axial piston pump being controlled with control variables that lead to errors is very small.

Specifically, the control model parameters of a control model of an axial piston pump are ascertained. The delivery volume is changed by means of an adjustable swivel plate by changing the swivel angle. An adjusting force of an adjusting unit of the axial piston pump, which is dependent on an actuating pressure, acts on the swash plate for adjustment. A pressure force resulting from the working pressure of the axial piston pump also acts on the swash plate. The swivel angle results from these forces depending on the rotational speed.

Operating variables (these are typically measurable variables) can be, for example: the rotational speed of the axial piston pump, the swivel angle of the swash plate or the working pressure, i.e. the pressure difference of the pressures present in the working lines connected to the axial piston pump, between which the axial piston pump delivers the hydraulic fluid. A measurable variable of elements connected to the axial piston pump can also be used; e.g. a rotational speed of a hydraulic motor connected to the working lines. In addition, first and/or second temporal derivatives of these aforementioned operating variables/variables can also be used as operating variables.

The method comprises providing initial control model parameters of the control model and an operating state set comprising a plurality of initial first operating points; and providing initial safety model parameters of a safety model based on a safety set comprising a plurality of initial second operating points and associated safety values, wherein the safety model models a safety variable as a function of the operating variables that enables an indication of whether fault-free operation is possible or not possible at the respective operating point.

In these two steps, early or initial models or their model parameters are provided, on the basis of which the further method steps are executed. The initial control model parameters and the initial operating state set form a starting point for the further method, which is considered safe and is ascertained, for example, by means of a physical simulation of the axial piston pump. Likewise, the initial safety model parameters and the initial safety set allow an assessment of the safety in the subsequent selection of further operating points. The sets of the initial first operating points and the initial second operating points are independent of each other, i.e. the initial second operating points do not have to be (but can be, at least partially) identical to the initial first operating points. The initial first operating points should be operating points at which fault-free operation is possible. This need not be the case for the initial second operating points.

The method further comprises executing, once or several times, a determination or selection of a further operating point which is not yet included in the operating state set, wherein the further operating point is determined such that a variance of the control model is maximized, under the condition that a probability obtained by the safety model that error-free operation at the further operating point is not possible is less than or equal to a predetermined safety threshold; updating the operating state set and the control model parameters of the control model taking into account the further operating point; and updating the safety set and the safety model parameters of the safety model taking into account the further operating point.

In other words, the further operating point is selected from the set of all operating points that are not yet included in the operating state set and whose probability, obtained from the safety model, that fault-free operation is not possible at the further operating point is less than or equal to a predefined safety threshold, wherein the selection from this set is made in such a way that the variance of the control model is maximized. By selecting a further operating point that maximizes the variance, operating variable ranges can be "explored" in which there is still a great deal of uncertainty about the behaviour of the axial piston pump.

The variance of the control model can be determined from the uncertainty of the prediction model for the operating points. If Gaussian processes are used, the prediction provides a mean value and a variance.

The probability that a fault-free operation is possible or not possible for an operating point is obtained by applying the safety model (understood as a figure) to the respective operating point and comparing the estimated safety value obtained in this way with the safety threshold, taking into account the distribution of a fault term if applicable. The distribution of an error term can also be determined in the model, for example in regression models.

The (actual) safety value for the respective further operating point can be determined as a function of the operating variables and/or other variables, wherein the operating variables and/or other variables can be measured in particular. For example, the working pressure $\Delta p$ can be used. Similarly, a pressure $p_1$, $p_2$ can be used in a working line, wherein the working pressure is the difference between the pressures in the two working lines: $\Delta p = p_1 - p_2$. A (partial) safety value S can be calculated from this, for example, as: $1 - P/P_{MAX}$; where P stands for the working pressure $\Delta p$ or for a pressure $p_1$, $p_2$ in the working lines and $P_{MAX}$ denotes a corresponding maximum pressure (determined by a pressure relief valve, for example). Similarly, a (partial) safety value can be determined based on the swivel angle in relation to a maximum possible swivel angle. Similarly, a maximum rotational speed that should not be exceeded can be specified for the rotational speed of the axial piston pump, even where there is a fixed rotational speed limit. Preferably, combinations, such as suitable sums or mean values, of these and possibly other partial safety values are used as the (total) safety value. Associated safety values can be determined in the same way for the initial second operating points. Alternatively or additionally, the expert knowledge of the person skilled in the art can also be incorporated here, who can directly define the safety model or its safety model parameters for certain operating variable ranges or operating points, for example.

Preferably, the control model and/or the safety model are regression models, wherein the operating variables are independent variables and at least one control variable is at least one dependent variable; wherein Gaussian process models are preferably used as regression models.

The models can therefore correspondingly be formulated as regression models as follows: Control model: $Y_j = f_j(X_i) + \in_j$; Safety Model: $S = g(X_i) + T$; wherein $Y_j$ stands for the at least one control variable, $X_i$ stands for the operating variables, S stands for the safety variable and $\in_j$ and T represent respective error terms, which are assumed to be normally distributed in particular. As part of the regression, the figures $f_j$ and g, which are characterized by the control model parameters and the safety model parameters respectively, are determined and the distribution of the error terms can also be determined. Corresponding regression methods are known to the person skilled in the art. For example, the method of least squares can be applied, i.e. a functional is minimized that depends on the quadratic deviations between measured control values/safety values and functional values obtained by applying the figures $f_j$ and g to the corresponding operating values (the operating state set and the safety set, respectively). A so-called maximum likelihood estimate can also be used, for example. The control model parameters or the safety model parameters are determined in such a way that the probability that the respective model produces the control values/safety values at the operating points (the operating state set or the safety set) is maximized, taking into account the distribution of the respective error terms.

In principle, the use of other models (as regression models) is also possible, such as the use of neural networks, provided that these models are able to determine a variance or uncertainty estimate.

Preferably, updating the operating state set and the control model parameters of the control model, taking into account the further operating point, includes ascertaining or measuring a further at least one control value of the at least one control variable, so that the further operating point is reached; adding the further operating point and at least one further ascertained control value to the operating state set in order to form a supplemented operating state set; and re-determining the control model parameters of the control model based on the supplemented operating state set. The control value is ascertained by operating the axial piston pump (e.g. in a test bench), wherein the control variables are set so that the further operating point is reached. The control model parameters are determined again according to the method used for modeling (e.g. regression method).

Preferably, updating the safety set and the safety model parameters of the safety model taking into account the further operating point comprises determining a safety value for the further operating point; adding the further operating point and the associated determined safety value to the safety set to form a supplemented safety set; and redetermining the safety model parameters of the safety model based on the supplemented safety set. The safety value is also determined or ascertained during operation of the axial piston pump (preferably during the operation mentioned in the aforementioned embodiment). For this purpose, the operating variables and/or other variables based on which the safety value is calculated are measured in particular. The safety model parameters are also determined again here according to the method used for modeling (e.g. regression method).

Preferably, providing initial control model parameters of the control model and an operating state set comprises determining the initial first operating points by means of physical modeling of the axial piston pump, wherein in the physical modeling, the first operating points are determined such that error-free operation is possible; and/or providing the initial first operating points using standard operating points known to allow error-free operation. The initial first operating points can be obtained by physical modeling and/or from standard operating points. In any case, they should be selected in such a way that fault-free operation is possible at the first operating points. The standard operating points can be ascertained using a reference axial piston pump or a prototype axial piston pump, for example. With both physical modeling and the use of standard operating points, operating points can be obtained that run error-free for all axial piston pumps within a series of axial piston pumps, i.e. these operating points can always be controlled error-free within the series distribution.

Preferably, providing initial control model parameters of the control model and an operating state set further comprises determining the control values associated with the first operating points by means of the physical modeling or by means of operating the axial piston pump and adjusting the control variables so that the respective first operating point is reached; and determining the control model parameters based on the determined first operating points and the determined associated control values. Alternatively, it would also be possible to use standard control model parameters that were ascertained using a reference axial piston pump or a prototype axial piston pump, for example.

Preferably, when providing initial safety model parameters of a safety model, the initial second operating points comprise both safe operating points at which error-free operation is possible and unsafe operating points at which error-free operation is not possible; preferably wherein the safe operating points at least partially comprise the initial first operating points. Unsafe operating points, at which fault-free operation is not possible, can be operating points at which it is clear that faults will occur. For example, if a pressure P used as an operating variable reaches or exceeds a maximum possible pressure $P_{MAX}$ (e.g. determined by a pressure relief valve). This configuration is useful if the safety model is a classification model. If it is a regression model, this is not absolutely necessary.

Preferably, a number of initial first operating points and a number of initial second operating points lie independently of each other in the range from 10 to 100. Equally preferably, the safety threshold is less than or equal to 5%; wherein the safety threshold is preferably 2%, more preferably 1%, still more preferably 0.5%, most preferably 0.1%. These numbers for the first/second operating points or these safety thresholds enable the (relatively) safe determination of further operating points. In general, a different number of initial first operating points and/or a different number of initial second operating points can also be selected. This is particularly dependent on the model. A lower safety threshold means greater safety, so the choice depends on the specific risk appetite. The greater the risk, the faster the exploration of the area of the operating points takes place, albeit with a higher risk of damage.

Preferably, the determination of a further operating point, the updating of the operating state set and the control model parameters, and the updating of the safety set and the safety model parameters are executed several times until an abort condition is fulfilled. Preferably, the abort condition comprises one or more of: the variance of the control model is below a predetermined threshold, a change in the control model parameters when updating the control model parameters is below a predetermined threshold, a change in the safety model parameters when updating the safety model parameters is below a predetermined threshold, or a distance of the further operating point from the set of other operating points in the operating state set is below a predetermined threshold. In principle, the abort conditions are therefore selected in such a way that, if they are met, no significant improvement in the control model is to be expected. A suitable metric can be used in the space of operating variables to determine the distance between operating points. As the different operating variables have different units and different value ranges, a scaling can be carried out first.

For example, the operating values can be scaled in such a way that the scaling maps operating values that lie between minimum and maximum operating values (or other suitably defined lower/upper operating values) to the interval between −1 and +1 (for operating variables that can assume positive and negative values, e.g. swivel angle) or to the interval between 0 and +1 (for operating variables that can only assume positive values, e.g. working pressure). After scaling, the Euclidean metric can be used, for example. The scaling can be linear or non-linear; the latter allows certain ranges of operating variables to be weighted more or less heavily.

Preferably, the at least one control variable comprises at least one control current for at least one pressure control valve of the adjustment unit, which can be actuated electromagnetically in particular.

A computing unit according to the disclosure, e.g. a control unit of a test bench, is set up, in particular in terms of programming, to carry out a method according to the disclosure.

The implementation of a method according to the disclosure in the form of a computer program or computer program product with program code for executing all method steps is also advantageous, as this results in particularly low costs, especially if an executing control device is still used for other tasks and is therefore available anyway. Suitable data storage media for providing the computer program in particular include magnetic, optical, and electric storage media, e.g., hard disks, flash memory, EEPROMs, DVDs, etc. Downloading a program via computer networks (Internet, intranet, etc.) is also possible.

Additional advantages and embodiments of the disclosure result from the description and the enclosed drawings.

It is understood that the features specified hereinabove and the features yet to be explained hereinafter can be used not only in the respectively specified combination, but also in other combinations, or alone, without departing from the scope of the present disclosure.

The methods and apparatus are thoroughly illustrated schematically in the drawings on the basis of exemplary embodiments and is described hereinafter with reference to the drawings.

DETAILED DESCRIPTION

Figure 1:
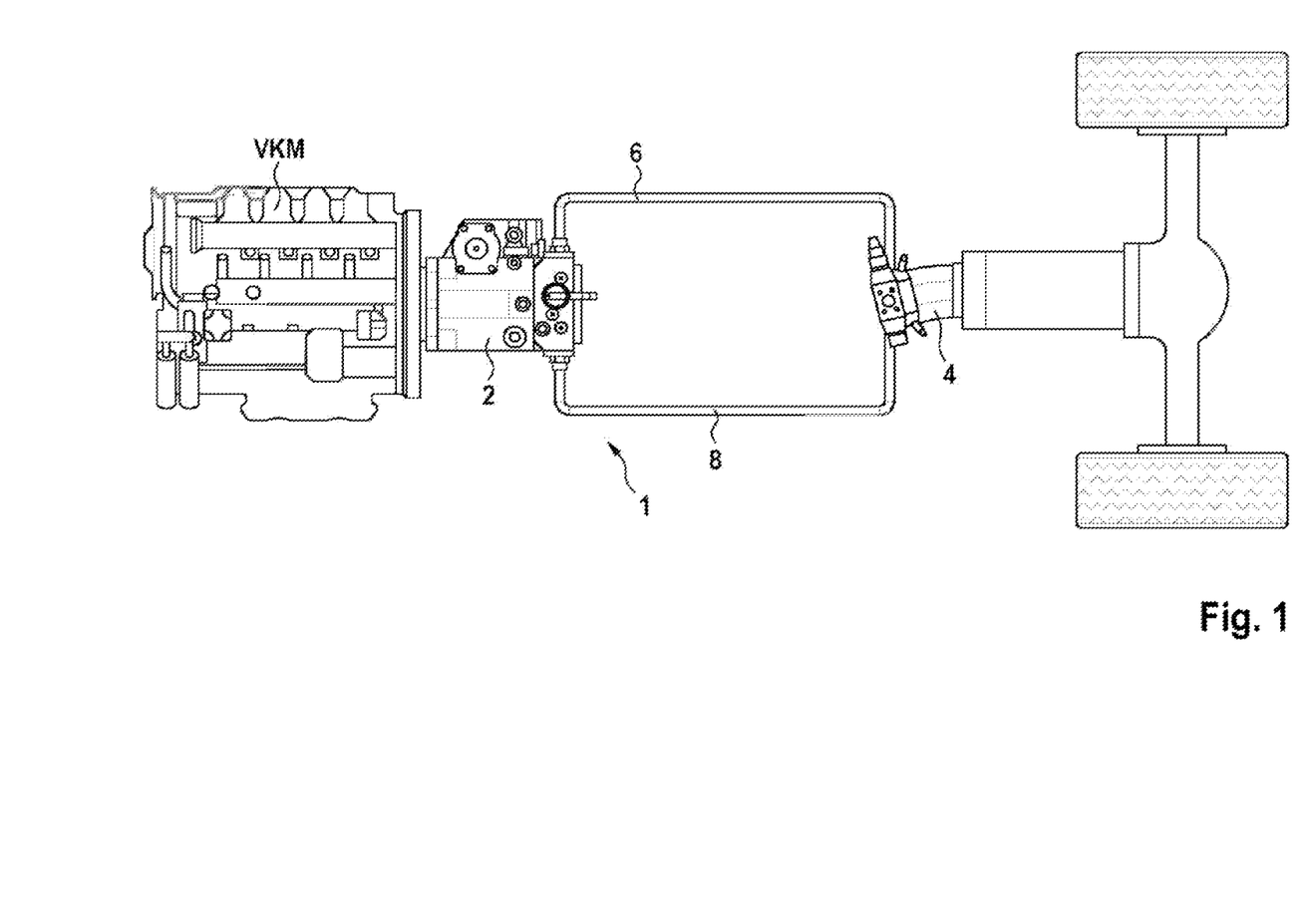
FIG. 1 shows a schematic representation of a hydrostatic traction drive with an axial piston pump, for which the method according to the disclosure is provided.

According to FIG. 1, a traction drive 1 has a primary variable adjustment pump 2 and a secondary variable adjustment motor 4 connected in series. The former, for example, is driven by an internal combustion engine (ICE). The primary unit 2 converts mechanical energy into hydraulic energy, while the secondary unit 4 converts hydraulic energy into mechanical energy on the output side. The process can also be reversed so that the secondary unit 4 brakes on the output side 2. The primary unit 2 and secondary unit 4 can be connected in an open circuit, i.e. the low-pressure sides of the primary unit 2 and secondary unit 4 are connected to a pressure-balanced tank, or in a closed circuit, i.e. the low-pressure sides of the primary side 2 and secondary side 4 are connected directly to each other. Both circuits are protected against excessive pressures by pressure relief valves. To increase the efficiency of the drivetrain, a power splitter can be used in which a mechanical power path is installed parallel to the hydrostatic part 2, 4. For operation, the primary unit 2 and secondary unit 4 are adjusted either separately or coupled. This results in a rotational speed on the secondary side that is proportional to the volume flow. The pressure is set according to the load torque and is limited at the top by the pressure relief valve.

Figure 2:
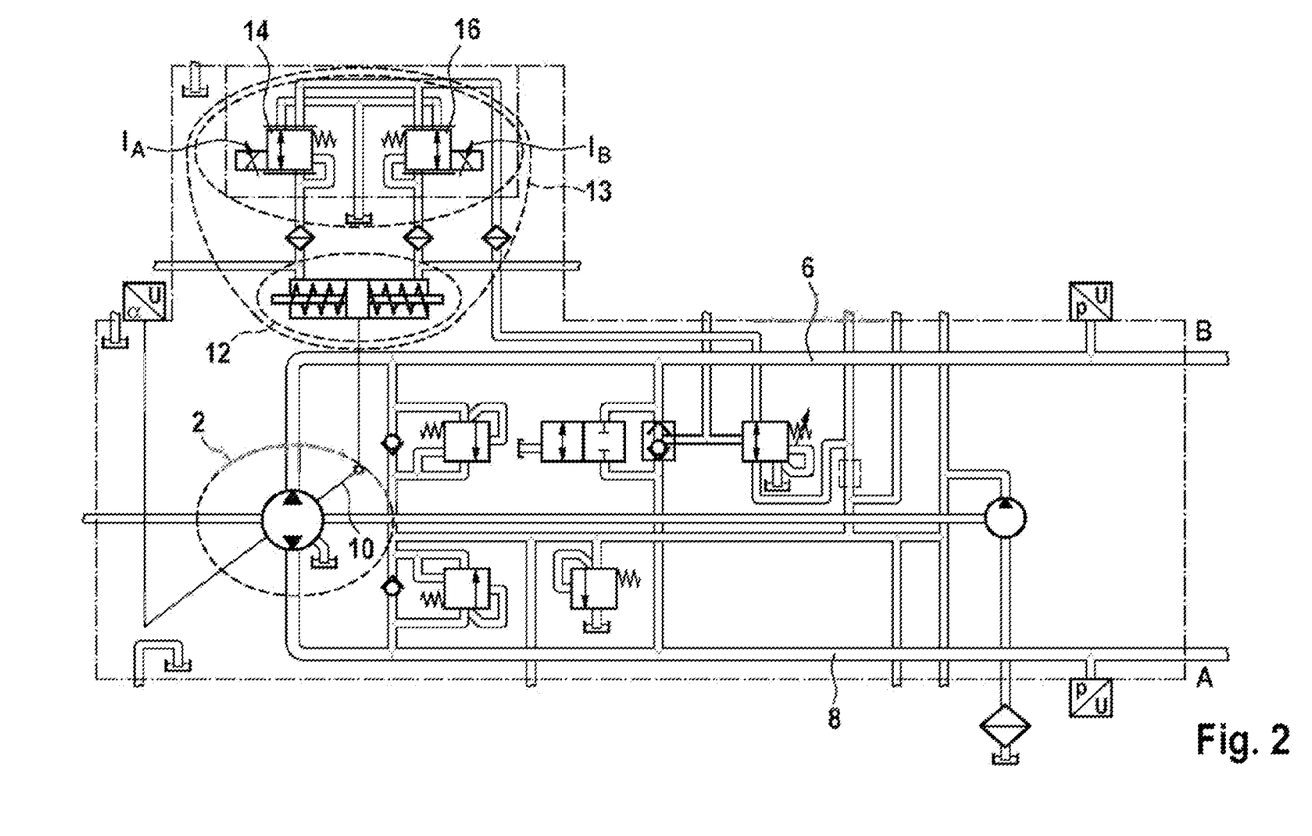
FIG. 2 shows a hydraulic circuit diagram of the axial piston pump of the traction drive as shown in FIG. 1.

According to FIG. 2, the axial piston pump 2 has a swash plate design, wherein its delivery volume flow in the working lines 6, 8 is adjusted by adjusting the swivel angle of its swash plate 10. This adjustment takes place via a mechanical coupling of the swash plate 10 with, for example, a double-acting hydraulic cylinder 12 of an adjustment unit 13. Both actuating chambers of the hydraulic cylinder 12 can be individually pressurized with actuating pressure medium (e.g. hydraulic oil). The respective actuating pressure in the actuating chambers is set via pressure control valves 14, 16 of the adjustment unit 13. The pressure control valves 14, 16 are designed here, for example, as electromagnetic valves and can be controlled by electrical currents, namely control currents IA, IB.

The axial piston pump 2 has a load-sensitive behavior, i.e. it is swung back by a high applied working pressure p or $\Delta p$. Should it be desired to keep the pump swung out despite high pressures, the pressure in the adjustment must therefore be increased. This characteristic steady-state behavior, which in addition to the differential pressure also depends on the rotational speed and the swivel angle itself, is usually calculated in advance for targeted adjustment or can be measured on the component test bench.

Figure 3:
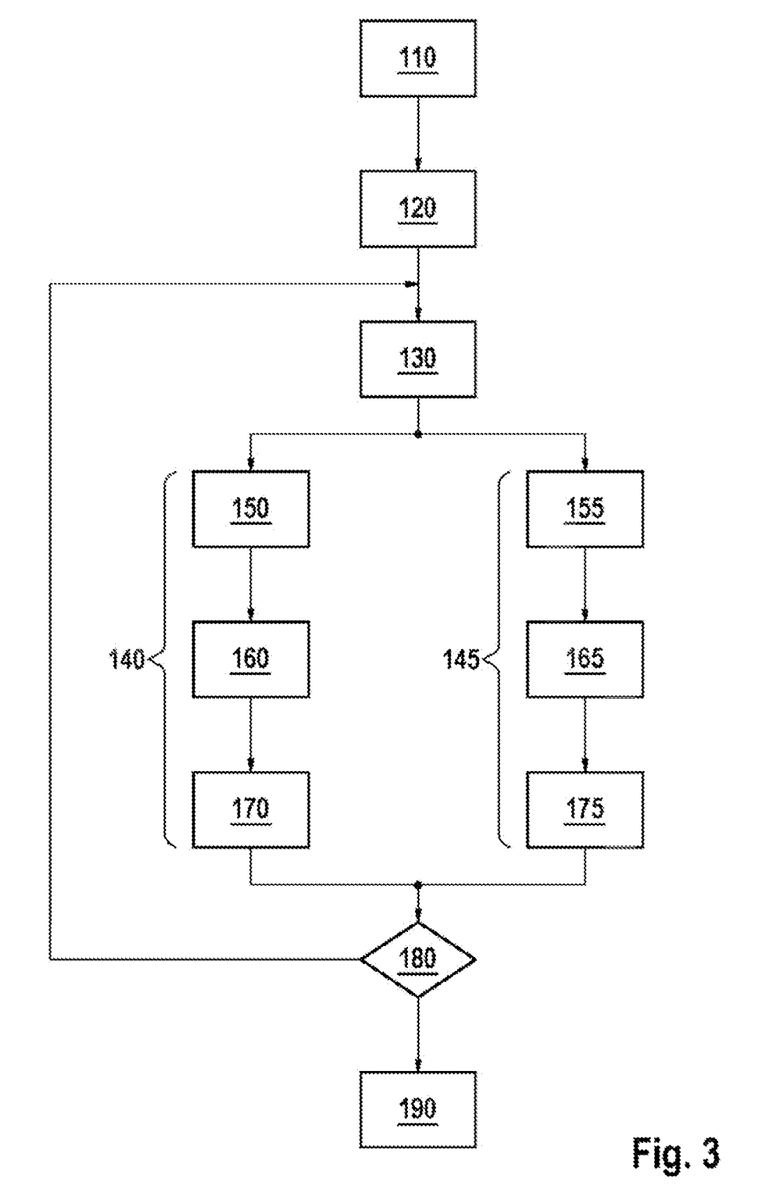
FIG. 3 shows a flow chart according to a preferred embodiment of the disclosure.

FIG. 3 shows a flow chart according to a preferred embodiment of the disclosure. In step 110, initial control model parameters of the control model and an operating state set comprising a plurality of initial first operating points are provided. These initial control model parameters and initial first operating points can be determined, for example, by means of a physical modeling (i.e. simulation) of the axial piston pump. It is also conceivable that applicable standard parameters (chosen conservatively with regard to safety) are used for all axial piston pumps.

In step 120, which may also be executed prior to or at least partially concurrently with step 110, initial safety model parameters of a safety model are provided based on a safety set comprising a plurality of initial second operating points and associated safety values. As already explained, the safety model models a safety variable as a function of the operating variables, which enables an indication to be made as to whether fault-free operation is possible or not possible at the respective operating point.

In step 130, a further operating point that is not yet included in the operating state set is determined. This is done in such a way that a variance of the control model is maximized, with the proviso that a probability obtained by the safety model that fault-free operation is not possible at the further operating point is less than or equal to a specified safety threshold.

This is followed by updating 140 the operating state set and the control model parameters of the control model and updating 145 the safety set and the safety model parameters of the safety model. This is always done taking into account the further operating point.

Specifically, the updating 140 of the operating state set and the control model parameters may comprise the sub-steps 150, 160, 170.

In step 150, a further at least one control value of the at least one control variable is ascertained so that the further operating point is reached. This is done by operating the axial piston pump (e.g. in a test bench) and controlling it by adjusting the control variables so that the next operating point is reached. For example, an adjacent operating point can be assumed and at least one control variable can be changed until the next operating point is reached. This is relatively easily done, as the (physical) effect of a change in a control variable on the operating variables is known in principle and therefore essentially requires a type of fine adjustment.

In step 160, the further operating point and the ascertained further at least one control value are added to the operating state set to form a supplemented operating state set.

In step 170, the control model parameters of the control model are then determined again based on the supplemented operating state set. This means that the parameters (control model parameters) of the control model are determined in such a way that the operating points are modeled as well as possible when applied. A regression method is the preferred method for this purpose.

Similarly, updating 145 the safety set and the safety model parameters may comprise sub-steps 155, 165, 175.

In step 155, a safety value is determined for the next operating point. For this purpose, variables, in particular operating variables, can be determined and/or measured during operation of the axial piston pump (for example in a test bench; see step 150), which can be used to determine the safety value. For example, a determination based on a relative distance of these variables to corresponding extreme values (e.g. maximum pressure) could be used here.

In step 165, the further operating point and the associated safety value determined in step 155 are added to the safety set to form a supplemented safety set.

In step 175, the safety model parameters of the safety model are determined again based on the supplemented safety set. Preferably, a regression method is used, wherein the safety values included in the safety set should be modeled again as well as possible by applying the model to the corresponding operating points.

In step 180, it is decided whether the procedure of steps 130, 140, 145 should be executed for additional further operating points. If this is the case, the system jumps back to step 130 (determining another operating point). A loop is therefore formed in which the set of safe operating points is gradually increased by one operating point with each run.

If, on the other hand, the steps 130, 140, 145 are not to be carried out for additional operating points, for example because an abort condition is fulfilled, the method can be terminated in step 190 and the control model can be used in the actual operation of the axial piston pump (i.e. in the operation for which the axial piston pump is intended). In this case further optimization of the control model is possible, possibly taking the safety model into account.

Possible abort conditions are, for example, that a predetermined number of runs of the loop have been made, that the variance of the control model is below a predetermined threshold, that the change in the control model parameters (in step 170) is below a predetermined threshold, that the change in the safety model parameters (in step 175) is below a predetermined threshold, or that a distance of the further operating point from the set of other operating points in the operating state set is below a predetermined threshold.

Figure 4:
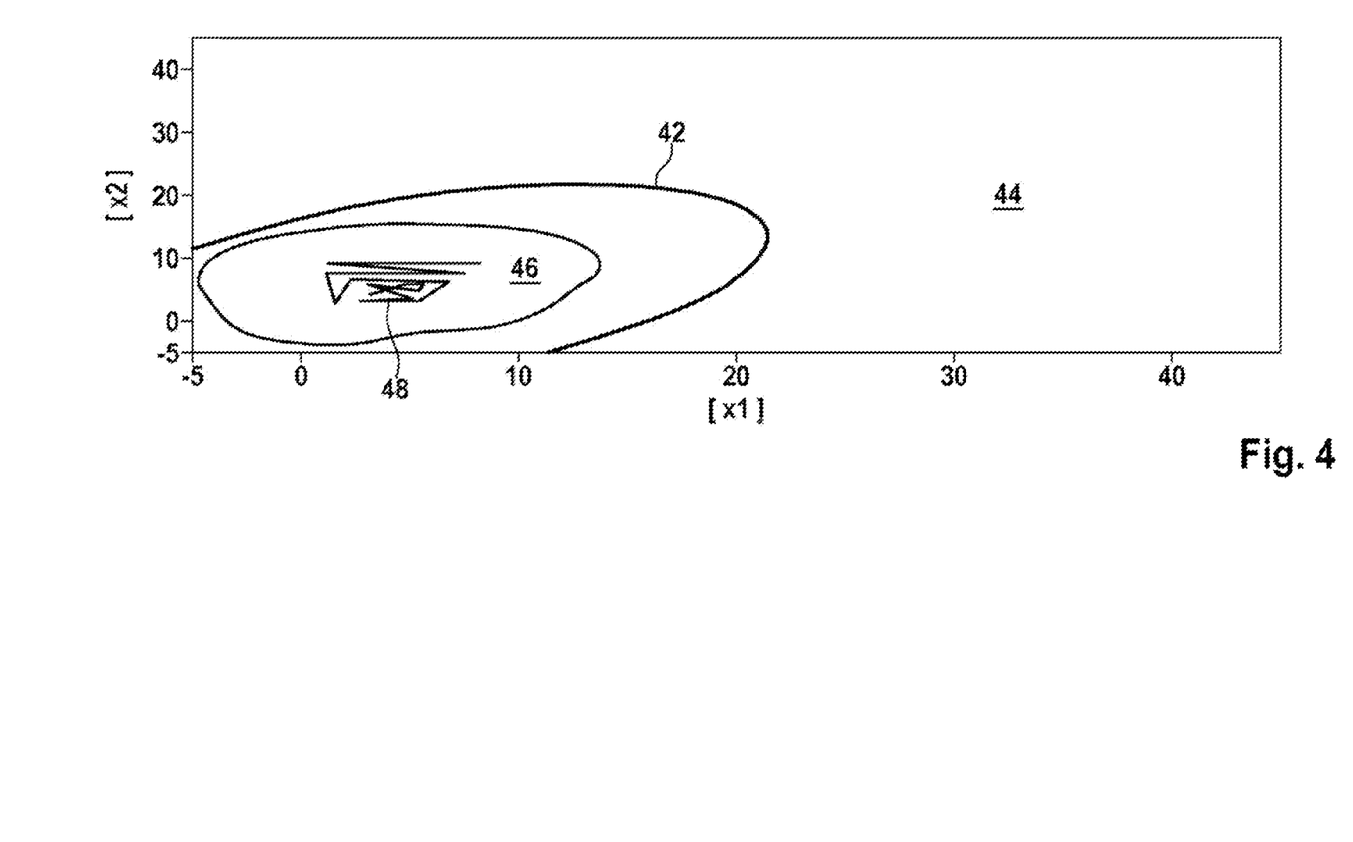
FIG. 4 illustrates safe and unsafe operating variable ranges.

FIG. 4 illustrates operating variables and safe and unsafe operating variable ranges. Here, x1 and x2 represent operating values of two operating variables specified in any units. An uncertain operating variable range 44 with uncertain operating values (i.e. error-free operation not possible) for the operating variables and a safe operating variable range 46 with safe operating values (i.e. error-free operation possible) for the operating variables are shown. These two ranges are separated by a (safety) boundary line 42. The position of the boundary line 42 is initially not exactly known and can be different for different axial piston pumps of the same type due to the series dispersion.

Furthermore, a line 48 is drawn which illustrates the progress of the method according to the disclosure, wherein corner points of the line 48 correspond to the (further) operating points which are selected and controlled in such a way that they are safe in the sense of the safety model and the variance of the control model is maximized in order to ascertain corresponding control values. Line 48 therefore corresponds to the progress of the loop in FIG. 3. Operating variable range 46, which is considered safe in terms of the safety model taking into account these other operating points, is also shown. The safe operating variable range 46 expands as the method progresses until finally the boundary line 42 is at least almost reached. In each step, a point within the respective safe operating variable range 46 is selected as a further operating point. The method according to the disclosure makes it possible, so to speak, to "explore" the safe range

The invention claimed is:

1. A method for ascertaining control model parameters of a control model of an axial piston pump, the axial piston pump including a swash plate having an adjustable swivel angle for adjusting a pump delivery volume of the axial piston pump, wherein an adjustment unit of the axial piston pump imparts an adjusting force on the swash plate for adjusting the swivel angle, wherein the adjusting force is dependent on an actuating pressure in at least one actuating chamber of the axial piston pump, wherein the control model is configured to model at least one control variable of the adjustment unit as a function of operating variables, wherein operating points of the axial piston pump are characterized in each case by specific operating values of the operating variables, the method comprising:
providing initial control model parameters of the control model;
providing an operating state set comprising a plurality of initial first operating points of the axial piston pump;
providing initial safety model parameters of a safety model, the initial safety model parameters based on a safety set comprising a plurality of initial second operating points of the axial piston pump and a corresponding safety value for each of the initial second operating points, wherein the safety model is configured to model a safety variable as a function of the operating variables, wherein the safety variable indicates whether fault-free operation is possible or not possible at a respective operating point of the initial second operating points;
executing the following steps once or several times:
determining a further operating point of the axial piston pump which is not yet included in the operating state set, wherein the further operating point is determined by:
maximizing a variance of the control model under a condition that a probability obtained by the safety model that the fault-free operation is not possible at the further operating point is less than or equal to a specified safety threshold;
updating the operating state set and the control model parameters of the control model based on the further operating point; and
updating the safety set and the safety model parameters of the safety model, based on the further operating point; and
operating the axial piston pump to deliver hydraulic fluid according to the updated operating state set, including the further operating point, so that the axial piston pump is configured for the fault-free operation.

2. The method according to claim 1, wherein the updating of the operating state set and the control model parameters comprises:
ascertaining or measuring a further at least one control variable of the adjustment unit so that the further operating point is reached by the axial piston pump;
adding the further operating point and the ascertained or measured further at least one control variable to the operating state set to form a supplemented operating state set; and
re-determining the control model parameters of the control model based on the supplemented operating state set.

3. The method according to claim 2, wherein updating the safety set and the safety model parameters of the safety model comprises:
determining a corresponding safety value for the further operating point;
adding the further operating point and the determined corresponding safety value to the safety set to form a supplemented safety set; and
re-determining the safety model parameters of the safety model based on the supplemented safety set.

4. The method according to claim 1, wherein the providing of the operating state set comprises:
determining the initial first operating points using a physical modeling of the axial piston pump, wherein in the physical modeling the initial first operating points are determined in such a way that the fault-free operation is possible; or
providing the initial first operating points using standard operating points of the axial piston pump from which it is known in advance that the fault-free operation is possible.

5. The method according to claim 4, wherein the providing of the operating state set further comprises:
determining the operating values associated with the initial first operating points using the physical modeling of the axial piston pump or by operating the axial piston pump and adjusting the at least one control variables so that each respective initial first operating point is reached; and
determining the control model parameters based on the determined initial first operating points and the determined associated operating values.

6. The method according to claim 1, wherein:
when providing the initial safety model parameters of the safety model, the initial second operating points comprise both safe operating points at which the fault-free operation is possible and unsafe operating points at which the fault-free operation is not possible, and
the safe operating points at least partially comprise the initial first operating points.

7. The method according to claim 1, wherein a number of the initial first operating points and a number of the initial second operating points lie independently of one another in a range from 10 to 100 operating points.

8. The method according to claim 1, wherein the specified safety threshold is less than or equal to 5%.

9. The method according to claim 1, wherein:
the determining of the further operating point, the updating of the operating state set and the control model parameters, and the updating of the safety set and the safety model parameters are executed several times until an abort condition is fulfilled, and
the abort condition comprises one or more of:
the variance of the control model being below a first predetermined threshold,
a change in the control model parameters when updating the control model parameters being below a second predetermined threshold,
a change in the safety model parameters when updating the safety model parameters being below a third predetermined threshold, and
a distance of the further operating point from a set of other operating points in the operating state set being below a fourth predetermined threshold.

10. The method according to claim 1, wherein the operating variables comprise one or more of a working pressure of the axial piston pump, a rotational speed of the axial piston pump, and the swivel angle of the swash plate.

11. The method according to claim 1, wherein the at least one control variable comprises at least one control current for at least one pressure control valve of the adjustment unit which is electromagnetically actuable.

12. The method according to claim 1, wherein:
the control model and/or the safety model are regression models,
the operating variables are independent variables and the at least one control variable is at least one dependent variable, and
wherein Gaussian process models are used as the regression models.

13. A processor configured to execute a method according to claim 1.

14. A computer program that causes a processor to perform a method according to claim 1 when executed on the processor.

15. A non-transitory machine-readable storage medium on which the computer program according to claim 14 is stored.

16. The method according to claim 1, wherein the specified safety threshold is 2%.

17. The method according to claim 1, wherein the specified safety threshold is 1%.

18. The method according to claim 1, wherein the specified safety threshold is 0.5%.

19. The method according to claim 1, wherein the specified safety threshold is 0.1%.

20. The processor of claim 13, wherein the processor is included in a test bench.

* * * * *